United States Patent [19]

McBurnett

[11] Patent Number: 4,762,195
[45] Date of Patent: Aug. 9, 1988

[54] HYDRAULIC STEERING SYSTEM
[75] Inventor: James R. McBurnett, Corinth, Miss.
[73] Assignee: Dana Corporation, Toledo, Ohio
[21] Appl. No.: 92,766
[22] Filed: Sep. 2, 1987
[51] Int. Cl.$^4$ ............................................. B62D 5/06
[52] U.S. Cl. .................................... 180/133; 60/405; 417/315
[58] Field of Search .................. 180/133; 60/405, 428; 417/315

[56] References Cited
U.S. PATENT DOCUMENTS

| | | | |
|---|---|---|---|
| 3,696,613 | 10/1972 | Goodale | 180/133 X |
| 3,750,405 | 8/1973 | Lech et al. | 180/132 X |
| 3,877,545 | 4/1975 | Orr | 417/315 X |
| 3,935,918 | 2/1976 | Hicks et al. | 180/133 |
| 4,076,096 | 2/1978 | Hushower et al. | 180/133 |

Primary Examiner—John A. Pekar
Attorney, Agent, or Firm—Willian Brinks Olds Hofer Gilson & Lione

[57] ABSTRACT

An hydraulic steering system for a ground-engaging, self-powered vehicle, the system including an engine driven primary pump for pumping hydraulic fluid to the steering system when the vehicle engine is operating and a wheel-driven secondary pump for pumping hydraulic fluid to the steering system when the vehicle is in motion, even if the engine or the engine driven primary pump is inoperable, or if the output of the engine driven primary pump is inadequate. The wheel-driven secondary pump is an over-center, axial piston pump which is controlled so that it is unidirectional in its output regardless of any change in direction of its input power source and which, thus, avoids the need for check valves in the hydraulic lines of the secondary pumping system, regardless of whether the vehicle is moving forward or in reverse when the engine becomes inoperable.

17 Claims, 2 Drawing Sheets

HYDRAULIC STEERING SYSTEM

BACKGROUND OF THE INVENTION

This invention relates to a system for providing a flow of hydraulic fluid to the steering assembly of a self-propelled, ground contacting vehicle. More particularly, this invention relates to a system for providing a supplemental or emergency flow of hydraulic fluid to the hydraulic steering assembly of a large, self-propelled vehicle, such as a construction machine.

Many types of off-road, self-propelled construction machines, such as graders and earth moving machines, and certain types of heavy, roadable machines, such as articulated loaders, are provided with hydraulically-operated steering systems. Typically, these hydraulically-operated steering systems utilize the vehicle engine as the source of power for the pump that is used to cause hydraulic fluid to flow through the steering system. However, the engine of such a vehicle is subject to accidental or inadvertent shutdowns at times when the vehicle is in motion, and the engine operated pump is subject to failure even when the engine continues to operate, for example, due to a coupling failure or a sheared drive shaft, and for safety reasons it is important to continue to hydraulically power the vehicle steering system whenever the vehicle is in motion, until it can be brought safely to a stop. This is frequently accomplished through the use of a wheel-driven or ground-driven supplemental or emergency hydraulic system, the use of such a system being characterized as an "emergency" system if it is only used during an engine off or pump failure situation, and as a "supplemental" system if it is also used to power the vehicle steering system during an engine on situation when the capacity of the primary or engine-driven hydraulic system is inadequate.

The use of a ground-driven emergency or supplemental hydraulic steering system for an off-road vehicle has heretofore significantly involved considerable complexity and expense, since such a system must be reversible to accommodate the fact that the vehicle may be moving in either a forward or a reverse direction when power from such a system is needed, and it must also be variable in capacity to deal with the fact that the ground speed of the vehicle is infinitely variable between maximum forward and reverse speeds at such times. These requirements have been met by various types of ground-driven emergency or supplemental hydraulic pumping systems, but the known types of hydraulic systems are costly and complex, involving the use of multiple check valves in order to be able to accommodate the reversible character of the prime mover for the pump for any such system, that is, the forward or reverse direction of motion of the vehicle. Thus, an emergency or supplemental system has heretofore been provided by the use of a ground-driven gear pump, in combination with four one-way or check valves, or by the use of a ground-driven, check ball, multi-piston piston pump, also in combination with two check valves for each piston of such pump. However, the use of such a large number of valves in a system of the foregoing type adds to the cost and the complexity of the system and introduces additional flow restrictions which limits the hydraulic capacity of the system.

SUMMARY OF THE PRESENT INVENTION

According to the present invention, there is provided a ground-driven emergency or supplemental steering system for an off-road, self-propelled vehicle and the steering system of this invention is inherently reversible and variable in displacement and, as a consequence thereof, avoids the need for flow diverters and check or flow control valves that characterizes prior art ground-driven emergency or supplemental hydraulic steering systems, thus reducing the complexity and the cost of the system and avoiding undue pressure-reducing restrictions to flow within the system. The system of the present invention utilizes an over-center, axial piston pump which is driven by a shaft from the transmission of the vehicle which always rotates when the vehicle is in motion, a source of power which can easily be controlled to be reversible in direction and variable in magnitude, and the over-center, axial piston pump, thus, is wellmatched to the operating characteristics of its prime mover.

DETAILED DESCRIPTION OF THE PREFERRED EMBODIMENT

Figure 1:
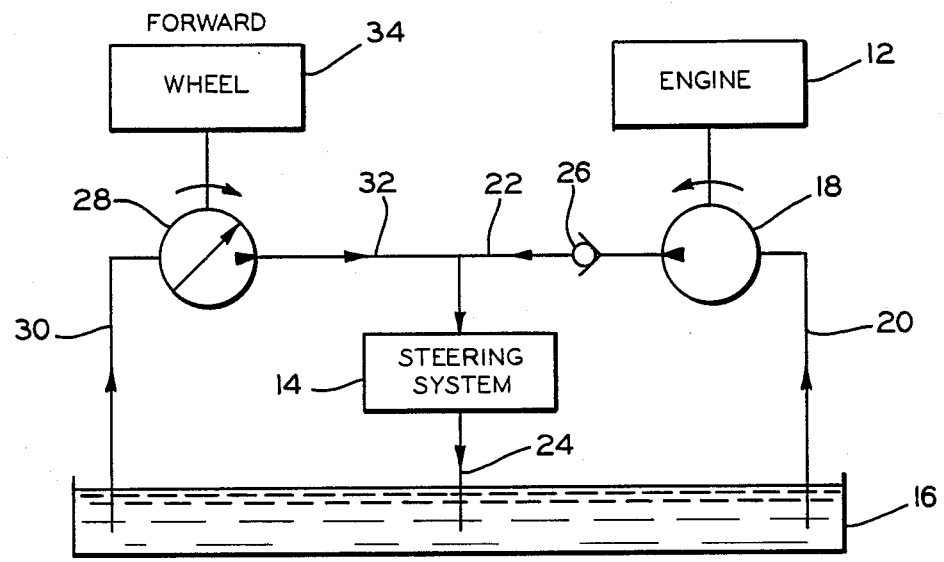
FIG. 1 is a diagrammatic view illustrating the hydraulic system of the preferred embodiment of the invention during the forward motion of a vehicle that incorporates such system.
Figure 2:
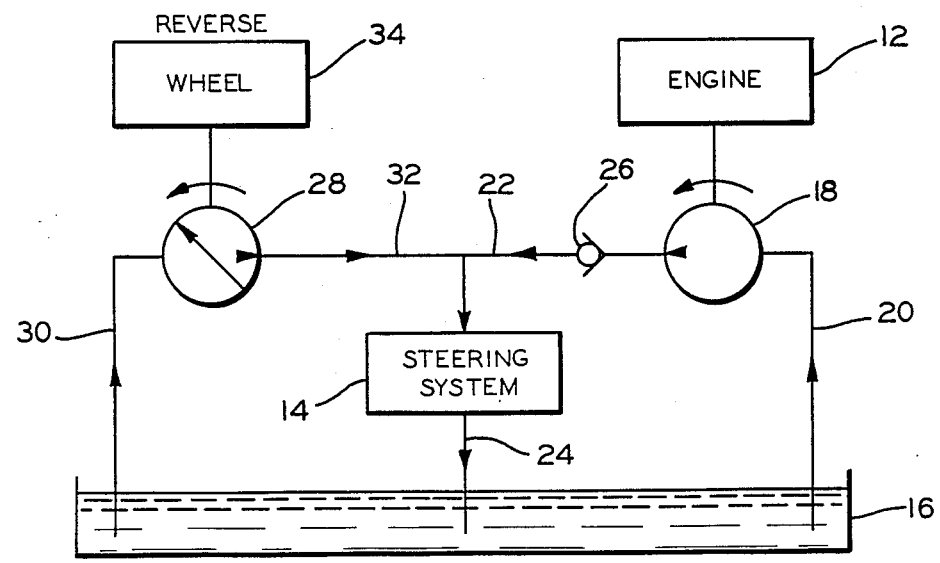
FIG. 2 is a view similar to FIG. 1 illustrating the hydraulic system thereof during the reverse motion of a vehicle that incorporates such system.
Figure 3:
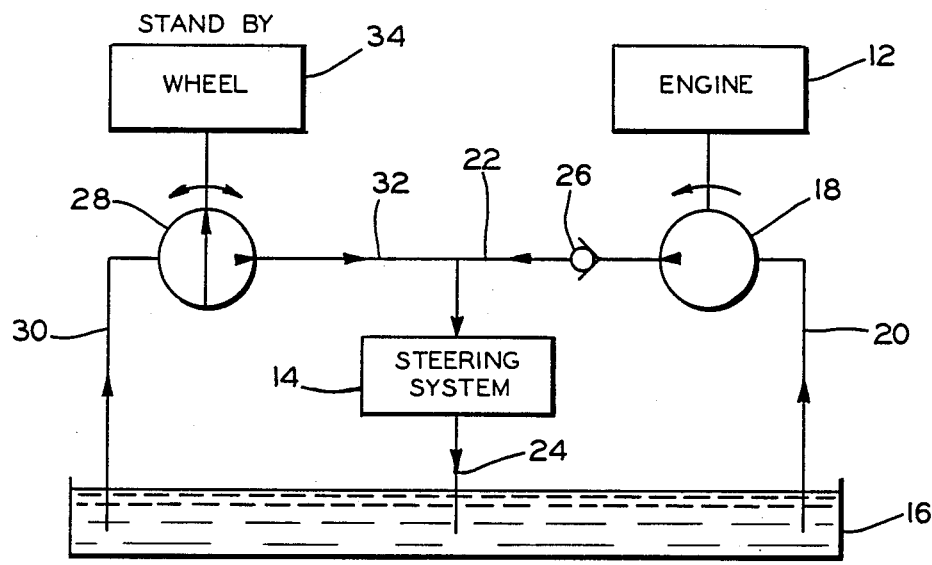
FIG. 3 is a view similar to FIGS. 1 and 2 illustrating the hydraulic system thereof in a "standby" operation condition.

As is shown in FIGS. 1, 2 and 3, a large vehicle, not shown, such as an off-road construction machine or a roadable articulated loader, is powered by an engine 12 shown schematically, which typically will be an internal combustion engine of the gasoline-powered or diesel type. The vehicle is provided with an hydraulic steering system 14, shown schematically, and the hydraulic steering system 14 receives hydraulic fluid from a reservoir 16 by means of a pump 18, an inlet conduit 20 from the reservoir 16 to the pump 18 and an outlet conduit 22 from the pump 18 to the steering system 14 and returns spent hydraulic fluid to the reservoir 16 by means of a return conduit 24. The direction of flow of hydraulic fluid from the reservoir 16 through the inlet conduit 20 to the pump 18, from the pump 18 to the steering systems through the outlet conduit 22 and back to the reservoir 16 through the return conduit 20 is prevented from reversing by a one-way flow or check valve 26, which is preferably located in the outlet conduit 22 on the high-pressure or outlet side of the pump 18.

Figure 4:
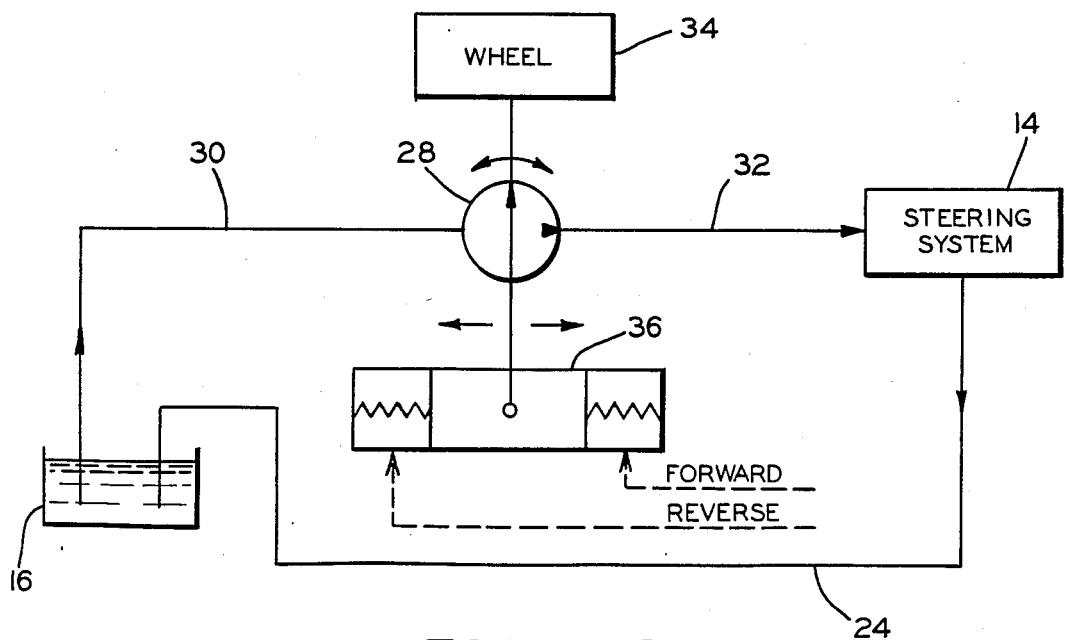
FIG. 4 is a view of an hydraulic system of the present invention which incorporates a control system for controlling the hydraulic system in accordance with the present invention.

For safety reasons, it is important that the hydraulic steering system 14 continue to receive hydraulic fluid at all times when the associated vehicle is in motion, including times when the vehicle engine 12 is not operating, and it is frequently desirable that the hydraulic steering system 14 receive supplemental hydraulic fluid at times when the vehicle engine 12 is operating too slowly to pump sufficient hydraulic fluid from the reservoir 16 to the hydraulic steering system 14 by way of the inlet conduit 20, the pump 18 and the outlet conduit 22. Thus, according to the present invention, an emergency or supplemental supply of hydraulic fluid to the hydraulic steering system 14 is provided from the reservoir 16 by means of a second pump 28, a second inlet conduit 30 from the reservoir 16 to the second pump 28 and a second outlet conduit 32 from the second pump 28 to the steering system 14, the emergency or supplemental supply of hydraulic fluid being returned from the hydraulic steering system 14 through the return conduit 24, the second pump 28 being driven by the transmission, not shown, which is used to drive the wheels of the vehicle, only one such wheel, element 34, being illustrated in the drawing. Thus, the pump 28 will be powered at all times when the vehicle is in motion, even if the engine 12 or the pump 18 has ceased to operate, and the hydraulic system 14 will continue to be powered until the vehicle has been brought safely to a stop. Of course, because the engine 12 can cease to operate either when the vehicle is moving forward, as is illustrated in FIG. 1, or when the vehicle is moving in reverse, as is illustrated in FIG. 2, it is important to ensure against a reversal of the direction of hydraulic fluid flow through the steering system 14. According to the present invention, this is accomplished without the need for one-way or check valves or diverter or flow control valves in the hydraulic circuit between the hydraulic steering system 14 and the second reservoir 26 by using a pump 28 which is of the over-center, axial piston type. A pump of this type is controlled, for example in accordance with the arrangement illustrated in FIG. 4, which will be hereinafter described more fully, so that it is uni-directional in its output regardless of any reversal of the direction of rotation of its input shaft, and, further, its output is infinitely variable between zero and a predetermined maximum by the rotation of a swash plate element within the pump 28, as is known in the hydraulic art. Thus, as is illustrated in FIG. 3, the pump 28 can be operated on a zero output, "standby" basis when the engine 12 is operating, or it can operate on a partial output basis to supplement the flow of hydraulic fluid from the pump 18 when the output from the pump 18 is inadequate for the demands of the steering system 14. As is shown in FIG. 4, the pump 28 in the hydraulic system between the reservoir 16 and the steering system 14 can be automatically controlled to be uni-directional in its output by a pilot signal from the vehicle transmission acting on a spring-centered, stroke control piston 36, such pilot signal indicating either that the transmission is in a forward gear, which urges the stroke control piston in a given direction away from its centered condition, or that the transmission is in a reverse gear, which urges the stroke control piston in the other direction away from its centered condition.

Although one preferred embodiment of this invention has been described and illustrated herein, the following claims are intended to cover various other embodiments which fall within the spirit and scope thereof.

I claim:

1. An hydraulic steering system for a ground-contacting vehicle having an engine to propel the vehicle, said vehicle being capable of moving in a forward motion direction and in a reverse motion direction, said hydraulic steering system comprising:
   steering means;
   a primary hydraulic system for supplying hydraulic fluid to said steering means, said primary hydraulic system being powered by said engine of said vehicle;
   a secondary hydraulic system for supplying hydraulic fluid to said steering means, said secondary hydraulic system being powered by motion of said vehicle and comprising reversible, variable displacement pumping means; and
   means responsive to the direction of motion of said vehicle for reversing the operation of said reversible, variable displacement pumping means upon the reversing of the direction of motion of said vehicle.

2. An hydraulic steering system according to claim 1 wherein said pumping means comprises an over-center, axial piston pump.

3. An hydraulic system according to claim 1 wherein said primary hydraulic system comprises a source of hydraulic fluid, conduit line means for transferring hydraulic fluid from said source of hydraulic fluid to said steering means, second conduit means for transferring hydraulic fluid from said steering means to said source of hydraulic fluid, and a pump for causing hydraulic fluid to flow from said source of hydraulic fluid through said conduit means to said steering means and from said steering means through said second conduit means to said source of hydraulic fluid.

4. An hydraulic system according to claim 3 wherein said primary hydraulic system further comprises one-way valve means in one of said conduit means and said second conduit means for preventing flow of hydraulic fluid from said steering means to said source of hydraulic fluid through said conduit means.

5. An hydraulic system according to claim 4 wherein said one-way valve means is located in said conduit means.

6. An hydraulic system according to claim 5 wherein said one-way valve means is located between said pump and said steering means.

7. An hydraulic system according to claim 3 wherein said secondary hydraulic system comprises third conduit means for transferring hydraulic fluid from said source of hydraulic fluid to said steering means, said pumping means causing hydraulic fluid to flow from said source of hydraulic fluid through said third conduit means to said steering means and from said steering means through said second conduit means to said source of hydraulic fluid.

8. An hydraulic system according to claim 7 wherein said pumping means comprises an over-center, axial piston pump.

9. An hydraulic system according to claim 8 wherein said third conduit means and said second conduit means are free of one-way valves.

10. An hydraulic steering system for a ground-contacting vehicle having an engine to propel the vehicle, said ground-contacting vehicle comprising a transmission which is capable of operating in a forward motion manner and in a reverse motion manner, said vehicle comprising:
   steering means;
   a primary hydraulic system for supplying hydraulic fluid to said steering means, said primary hydraulic system being powered by said engine of said vehicle, said primary hydraulic system comprising a source of hydraulic fluid, conduit means for transferring hydraulic fluid from said source of hydraulic fluid to said steering means, second conduit means for transferring hydraulic fluid from said steering means to said source of hydraulic fluid, and a pump for causing hydraulic fluid to flow from said source of hydraulic fluid to flow from said source of hydraulic fluid through said conduit means to said steering means and from said steering means through said second conduit means to said source of hydraulic fluid;

a secondary hydraulic system for supplying hydraulic fluid to said steering means, said secondary hydraulic system being powered by motion of said vehicle and comprising reversible, variable displacement pumping means, third conduit means for transferring hydraulic fluid from said source of hydraulic fluid to said steering means, said pumping means causing hydraulic fluid to flow from said source of hydraulic fluid through said third conduit means to said steering means and from said steering means through said second conduit means to said source of hydraulic fluid; and control means responsive to the manner of motion of the transmission of the vehicle for controlling the operation of said pumping means.

11. An hydraulic system according to claim 10 wherein said control means is a spring centered, stroke control piston.

12. An hydraulic steering system according to claim 10 wherein said pumping means comprises an over-center, axial piston pump.

13. An hydraulic system according to claim 12 wherein said primary hydraulic system further comprises one-way valve means in one of said conduit means and said second conduit means for preventing flow of hydraulic fluid from said steering means to said source of hydraulic fluid through said conduit means.

14. An hydraulic system according to claim 13 wherein said one-way valve means is located in said conduit means.

15. An hydraulic system according to claim 14 wherein said one-way valve means is located between said pump and said steering means.

16. An hydraulic system according to claim 10 where in said pumping means comprises an over-center, axial piston pump.

17. An hydraulic system according to claim 16 wherein said third conduit means and said second conduit means are free of one-way valves.

* * * * *